US010382658B2

(12) United States Patent
Kono

(10) Patent No.: US 10,382,658 B2
(45) Date of Patent: Aug. 13, 2019

(54) CONTOUR ENHANCEMENT PROCESSING CIRCUIT, CONTOUR ENHANCEMENT PROCESSING METHOD, AND TELEVISION CAMERA

(71) Applicant: HITACHI KOKUSAI ELECTRIC INC., Tokyo (JP)

(72) Inventor: Hirokazu Kono, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 0 days.

(21) Appl. No.: 15/775,291

(22) PCT Filed: Nov. 9, 2016

(86) PCT No.: PCT/JP2016/083207
§ 371 (c)(1),
(2) Date: May 10, 2018

(87) PCT Pub. No.: WO2017/082286
PCT Pub. Date: May 18, 2017

(65) Prior Publication Data
US 2018/0376036 A1 Dec. 27, 2018

(30) Foreign Application Priority Data

Nov. 12, 2015 (JP) .................. 2015-222457

(51) Int. Cl.
*H04N 5/208* (2006.01)
*H04N 5/232* (2006.01)
(Continued)

(52) U.S. Cl.
CPC .............. *H04N 5/208* (2013.01); *G06T 5/00* (2013.01); *G06T 5/003* (2013.01); *H04N 5/217* (2013.01);
(Continued)

(58) Field of Classification Search
CPC ........ H04N 5/208; H04N 5/217; H04N 5/232; G06T 5/003; G06T 5/00; G06T 2207/10016

See application file for complete search history.

(56) References Cited

U.S. PATENT DOCUMENTS

| 6,897,897 | B2 * | 5/2005 | Mise | ........ | H04N 9/045 |
| | | | | | 348/222.1 |
| 2009/0284661 | A1 * | 11/2009 | Honda | ........ | H04N 5/213 |
| | | | | | 348/607 |

(Continued)

FOREIGN PATENT DOCUMENTS

| JP | H08-065548 A | 3/1996 |
| JP | 2002-077667 A | 3/2002 |

(Continued)

OTHER PUBLICATIONS

International Search Report dated Feb. 7, 2017.

*Primary Examiner* — Lin Ye
*Assistant Examiner* — John H Morehead, III
(74) *Attorney, Agent, or Firm* — Bacon & Thomas, PLLC

(57) ABSTRACT

A contour enhancement processing circuit includes a crisp circuit for removing a noise component from a contour component signal using a crisp signal for removing a noise component in the contour component signal and outputting a contour signal, a crisp gain control circuit for obtaining a gain for controlling amplification of a signal becoming the basis of the crisp signal according to a video level and outputting the gain as a crisp gain, a multiplier for multiplying the crisp gain and the signal becoming the basis of the crisp signal and outputting a crisp signal to the crisp circuit, a gain circuit for amplifying the contour signal from which a noise component is removed in the crisp circuit, and an adder for adding the video signal transmitted from a delay (Continued)

circuit and the amplified contour signal transmitted from the gain circuit and outputting a contour-enhanced video signal.

6 Claims, 16 Drawing Sheets

(51) Int. Cl.
 *H04N 5/217* (2011.01)
 *G06T 5/00* (2006.01)
(52) U.S. Cl.
 CPC ... *H04N 5/232* (2013.01); *G06T 2207/10016* (2013.01)

(56) References Cited

U.S. PATENT DOCUMENTS

2012/0314969 A1  12/2012  Furukawa et al.
2017/0192229 A1* 7/2017  Nakamura ............. G02B 17/02

FOREIGN PATENT DOCUMENTS

JP   2008-047986 A   2/2008
WO   2011-105377 A1  9/2011

* cited by examiner

CONTOUR EXTRACTION CIRCUIT

DIAGRAM SHOWING RELATIONSHIP BETWEEN
VIDEO LEVEL AND CRISP GAIN

VIDEO SIGNAL WAVEFORM

↓ CONTOUR EXTRACTION

CONTOUR SIGNAL WAVEFORM

↓ CRISP (ASSOCIATED WITH VIDEO LEVEL)

↓ AMPLIFICATION

CONTOUR SIGNAL WAVEFORM

SYNTHESIS

VIDEO IMAGE + CONTOUR SIGNAL WAVEFORM

SIGNAL WAVEFORM DIAGRAM SHOWING THE PRESENT CONTOUR ENHANCEMENT PROCESS

DIAGRAM SHOWING SLOPE CONTROL OF
CRISP GAIN WITH REFERENCE TO VIDEO LEVEL

CONFIGURATION BOCK DIAGRAM OF TELEVISION CAMERA

CONVENTIONAL FIRST CONTOUR ENHANCEMENT PROCESSING CIRCUIT

VIDEO EXAMPLE
(BEFORE CONTOUR ENHANCEMENT)

VIDEO EXAMPLE
(AFTER CONTOUR ENHANCEMENT)

VIDEO SIGNAL WAVEFORM

↓ CONTOUR EXTRACTION

CONTOUR SIGNAL WAVEFORM

↓ AMPLIFICATION

CONTOUR SIGNAL WAVEFORM

↓ SYNTHESIS

VIDEO IMAGE + CONTOUR SIGNAL WAVEFORM

SIGNAL WAVEFORM DIAGRAM SHOWING IDEAL CONTOUR ENHANCEMENT PROCESS

VIDEO SIGNAL WAVEFORM

| CONTOUR EXTRACTION

CONTOUR SIGNAL WAVEFORM

| AMPLIFICATION

CONTOUR SIGNAL WAVEFORM

| SYNTHESIS

VIDEO IMAGE + CONTOUR SIGNAL WAVEFORM

SIGNAL WAVEFORM DIAGRAM WHEN NOISE IS CONTAINED IN VIDEO SIGNAL

CONVENTIONAL SECOND CONTOUR
ENHANCEMENT PROCESSING CIRCUIT

SIGNAL WAVEFORM DIAGRAM SHOWING CRISP FUNCTION

CONTOUR SIGNAL WAVEFORM

SYNTHESIS

VIDEO IMAGE + CONTOUR SIGNAL WAVEFORM

SIGNAL WAVEFORM DIAGRAM SHOWING CONVENTIONAL
SECOND CONTOUR ENHANCEMENT PROCESS

CONTOUR SIGNAL WAVEFORM DIAGRAM FOR EXPLAINING PROBLEM OF PRIOR ART

CONTOUR ENHANCEMENT PROCESSING CIRCUIT, CONTOUR ENHANCEMENT PROCESSING METHOD, AND TELEVISION CAMERA

FIELD OF THE INVENTION

The present invention relates to a contour enhancement processing circuit in a video signal processing unit of a television camera, and more particularly to a contour enhancement processing circuit, a contour enhancement processing method and a television camera which are capable of clearly enhancing a contour by reducing a noise in contour enhancement processing.

BACKGROUND OF THE INVENTION

Video signal processing in a conventional television camera will be described below.

(Television Camera: FIG. 7)

The configuration of the television camera will be explained with reference to FIG. 7. FIG. 7 is a block diagram showing the configuration of the television camera.

As shown in FIG. 7, the television camera 1 includes a lens 2, a prism 3, an imaging element 4, a CDS (Correlated Double Sampling) circuit 5, a VGA (Variable Gain Amplifier) circuit 6, an A/D (Analog to Digital) converter 7, a video signal processing unit 8, a video signal output unit 9, a TG (Timing Generator) 10, and a CPU (Central Processing Unit) 11.

Next, the operation of the television camera will be explained.

First, a subject image passes through the lens 2 of the television camera 1. The subject image is divided into three colors of R (red), G (green) and B (blue) in the prism 3 and is converted into electrical signals of R, G and B in the imaging elements 4R, 4G and 4B.

Thereafter, the electric signals pass through the CDS circuits 5R, 5G and 5B and are amplified by the VGA circuits 6R, 6G and 6B. Then, the electric signals are converted into digital signals from analog signals in the A/D converters 7R, 7G and 7B. After the electric signals are subjected to various signal processes in the video signal processing unit 8, a television signal is outputted from the video signal output unit 9.

The TG 10 generates a timing signal for driving the imaging element 4 and the CDS circuit 5, and the CPU 11 as a system controller controls the circuits of the respective units.

(Conventional First Contour Enhancement Processing Circuit: FIG. 8)

A conventional first contour enhancement processing circuit as a contour enhancement processing circuit in the video signal processing unit 8 will be described with reference to FIG. 8. FIG. 8 is a block diagram showing the configuration of a conventional first contour enhancement processing circuit.

The conventional first contour enhancement processing circuit is provided in the video signal processing unit 8. As shown in FIG. 8, the conventional first contour enhancement processing circuit includes a delay circuit 12, an adder 13, a contour extraction circuit 14 and a gain circuit 15.

In the operation of the conventional first contour enhancement processing circuit, a video signal is inputted to the delay circuit 12 and the contour extraction circuit 14. The delay circuit 12 delays the signal processing time of the contour extraction circuit 14 and the gain circuit 15, and outputs a delayed video signal 12a to the adder 13.

The contour extraction circuit 14 extracts a contour component from the inputted video signal, and outputs a contour signal 14a to the gain circuit 15.

The gain circuit 15 amplifies the contour signal 14a according to the amplification amount (gain) inputted from the CPU 11, and outputs a contour signal 15a to the adder 13. The adder 13 adds the contour signal 15a and the delayed video signal 12a whose phase is brought into coincidence with that of the contour signal 15a by the delay circuit 12, thereby outputting a contour-enhanced video signal.

(Image Example: FIGS. 9A and 9B)

Next, an image example related to contour enhancement will be described with reference to FIGS. 9A and 9B. FIG. 9A is a view showing an original image example (an image example before contour enhancement), and FIG. 9B is a view showing an image example after contour enhancement.

While FIG. 9A shows an example of an original image (an image before contour enhancement), FIG. 9B shows an example of a contour-enhanced image (an image after contour enhancement). In FIG. 9B, an image signal is processed so that the contour portion of an image pattern becomes clear.

(Signal Waveform Showing Ideal Contour Enhancement Process: FIGS. 10A to 10D)

A signal waveform showing a noise-free ideal contour enhancement process will be described with reference to FIGS. 10A to 10D. FIGS. 10A to 10D are signal waveform diagrams showing an ideal contour enhancement process. In FIGS. 10A to 10D, 11A to 11D and 14A to 14E, the vertical axis represents a video signal level, and the horizontal axis represents a video signal waveform.

FIG. 10A shows a noise-free ideal signal waveform in an image example shown in FIG. 9A. In FIG. 9A, the image is dark on the left side and is gradually brightened toward the right side. Thus, the video signal level is increasing stepwise in the horizontal axis direction.

In FIG. 10B, there is shown a contour signal waveform obtained by extracting a contour from the noise-free ideal video signal using the contour extraction circuit 14.

In FIG. 10C, there is shown a signal waveform obtained by amplifying the contour signal 14a using the gain circuit 15. In FIG. 10D, there is shown a contour-enhanced video signal waveform obtained by adding the amplified contour signal to the delayed video signal using the adder 13. The contour-enhanced video signal is the image example shown in FIG. 9B as an image example.

Meanwhile, a noise is contained in an actual video signal. Thus, a noise is also contained in the contour signal 14a extracted by the contour extraction circuit 14. As the contour signal 14a is amplified by the gain circuit 15, the noise is also amplified. When the contour enhancement is strengthened, the noise of the video signal and the contour-enhanced noise are synthesized in the outputted contour-enhanced video signal.

(Signal Waveform when Noise is Contained in Video Signal: FIGS. 11A to 11D)

Next, a signal waveform when a noise is contained in the video signal will be described with reference to FIGS. 11A to 11D. FIGS. 11A to 11D shows a signal waveform when a noise is contained in the video signal.

FIG. 11A shows an example in which a noise is contained in the video signal and shows a video signal waveform containing a noise having a characteristic that the noise increases in proportion to a video signal level.

In FIG. 11B, there is shown a contour signal waveform obtained by extracting a contour from a noise-containing video signal using the contour extraction circuit 14. Since a contour of the noise is also extracted, a noise is also contained in the contour signal waveform.

In FIG. 11C, there is shown a contour signal waveform obtained by amplifying the contour signal using the gain circuit 15. Thus, the noise contained in the contour signal is also amplified.

In FIG. 11D, there is shown a signal waveform of the contour-enhanced video signal obtained by adding (synthesizing) the amplified contour signal to the delayed video signal using the adder 13. A noise is contained in the delayed video signal. A noise is also contained in the contour signal waveform and is amplified. Therefore, the contour is enhanced in the contour-enhanced video signal obtained by synthesizing the delayed video signal and the contour signal waveform. Since the noises are overlapped and increased, the image has a rough feeling.

(Conventional Second Contour Enhancement Processing Circuit: FIG. 12)

In order to prevent the above noise, it is usual to perform a crisp process after the contour extraction circuit 14. The crisp process is a process of removing a noise signal from the contour signal.

Next, as a contour enhancement processing circuit for performing the crisp process, a conventional second contour enhancement processing circuit will be described with reference to FIG. 12. FIG. 12 is a block diagram showing the configuration of the conventional second contour enhancement processing circuit.

As shown in FIG. 12, the conventional second contour enhancement processing circuit has a configuration in which a crisp circuit 16 is provided between the contour extraction circuit 14 and the gain circuit 15 in the contour enhancement processing circuit of FIG. 8.

The delay circuit 12 outputs a delayed video signal 12b obtained by delaying the inputted video signal by the time of the signal processing in the contour extraction circuit 14, the crisp circuit 16 and the gain circuit 15.

The crisp circuit 16 removes a noise from the contour signal 14a of the contour component extracted by the contour extraction circuit 14 using a noise reduction amount (crisp) signal and outputs a contour signal 16a.

The gain circuit 15 amplifies the noise-removed contour signal 16a by the amplification amount (gain) inputted from the CPU 11 and outputs the amplified contour signal 15b to the adder 13.

The adder 13 adds the contour signal 15b to the video signal 12b whose phase is matched with that of the contour signal 15b by the delay circuit 12, thereby obtaining a contour-enhanced video signal.

The specific operation of the conventional second contour enhancement processing circuit will be described.

The conventional second contour enhancement processing circuit obtains a contour signal 16a, from which a noise component is removed by the crisp circuit 16, from the contour signal 14a containing a noise. If the contour signal 16a is amplified by the gain circuit 15, a contour signal 15b in which only a contour portion is enhanced is obtained. A clear image with little noise is obtained by adding the contour-enhanced contour signal 15b and the video signal 12b using the adder 13. In this regard, a crisp signal is a signal transmitted from the CPU 11 that designates a noise removal amount (crisp amount) of the crisp circuit 16.

(Signal Waveform Indicating Crisp Function: FIG. 13)

A crisp function will be described with reference to FIG. 13 is a signal waveform diagram showing the crisp function.

As shown in FIG. 13, the noise of the contour signal containing a noise is removed by the crisp circuit 16. However, the contour signal is also reduced by the amount of noise reduction. Thus, the gain circuit 15 performs gain amplification by amplifying the contour signal to have the original signal level. The process of removing a noise by the crisp function is referred to as a crisp process.

(Signal Waveform Showing Conventional Second Contour Enhancement Process: FIGS. 14A to 14E)

A signal waveform showing a conventional second contour enhancement process will be described with reference to FIGS. 14A to 14E. FIG. 14A to 14E are signal waveform diagrams showing the conventional second contour enhancement process.

In FIG. 14A, there is shown an example of a video signal waveform in which a noise component is contained in a video signal. The noise signal having a noise component has a characteristic that the noise increases in proportion to the video level.

In FIG. 14B, the contour is extracted from the video signal by the contour extraction circuit 14, and the contour of a noise is also extracted. Therefore, a noise component is also contained in the contour signal waveform.

In FIG. 14C, there is shown a signal waveform from which a noise is reduced by the crisp circuit 16. The crisp amount in the crisp process is constant irrespective of the video level.

In FIG. 14D, there is shown a contour signal waveform obtained by amplifying the contour signal in the gain circuit 15. In this regard, only the contour is amplified in the portion where the noise component is removed in the crisp process. However, the noise component is also amplified in the remaining portion.

In FIG. 14E, there is shown a video signal waveform in which the contour signal is added to the video signal by the adder 13. In the contour-enhanced video signal, the contour is enhanced. However, the remaining noise component is also increased. Therefore, the image has a rough feeling. That is to say, the contour-enhanced video signal shown in FIG. 14E is obtained by synthesizing the video signal waveform of FIG. 14A and the contour signal waveform shown of FIG. 14D.

(Contour Signal Waveform for Explaining Problem of Prior Art: FIG. 15)

Next, a contour signal waveform for explaining the problem of prior art will be described with reference to (a) to (c) of FIG. 15. (a) to (c) of FIG. 15 are contour signal waveform diagrams for explaining the problem of prior art.

In (a) of FIG. 15, there is shown an example in which the contour signal contains a noise signal having a characteristic that the noise component increases in proportion to the video level of the video signal.

Since the crisp amount is constant when performing the crisp process, the influence on the contour signal waveform varies depending on the degree of the crisp amount.

In (b) of FIG. 15, there is shown a case where the crisp amount is matched with the noise component of the portion where the video level of the video signal is high. The noise component is completely eliminated, but the contour signal is small. When the contour signal is originally small, the contour may disappear.

In (c) of FIG. 15, there is shown a case where the crisp amount is matched with the noise component of the portion where the video level of the video signal is low. The noise component having a high video level of the video signal is not removed and remains.

RELATED ART

As related art, there is Japanese Patent Application Publication No. 2009-303206 entitled "Solid-state imaging device and monitoring system" (Hitachi Kokusai Electric Co., Ltd.) (Patent Document 1).

Patent Document 1 discloses a technique for realizing, in a solid-state imaging device, both of the correction of the low variation in the vertical direction of a solid-state imaging element from a low frequency and the suppression of the overshoot or the undershoot. In particular, Patent Document 1 describes that the contour is corrected from a low frequency.

However, in the conventional contour enhancement processing circuit, the crisp circuit operates to remove the noise component by a constant crisp amount irrespective of the video signal level. Therefore, if the crisp amount is matched with the noise component of the portion where the video level of the video signal is high, the contour signal is smaller than necessary. When the contour signal is originally small, there is a possibility that the contour signal may be lost. If the crisp amount is matched with the noise component of the portion where the video level of the video signal is low, there is a problem that the noise component of the portion where the video level of the video signal is high is not removed and remains.

In Patent Document 1, it is described that the contour is corrected from a low frequency. However, the amount of noise to be removed cannot be made variable according to the video signal level. It is not possible to realize a clear contour enhancement process with little noise from a dark portion to a bright portion.

The present invention has been made in view of the above situations. It is an object of the present invention to provide a contour enhancement processing circuit, a contour enhancement processing method and a television camera, which are capable of making sure that the amount of noise to be removed in a crisp circuit can be made variable according to a video signal level and capable of realizing a clear contour enhancement process with little noise from a dark portion to a bright portion.

SUMMARY OF THE INVENTION

In accordance with an aspect of the present invention, there is provided a contour enhancement processing circuit used in a video signal processing unit of a television camera, including: a first delay circuit configured to delay an inputted video signal; a contour extraction circuit configured to extract a contour component signal from the video signal; a second delay circuit configured to delay the contour component signal; a video level detection circuit configured to detect a video level of the video signal and output the video level; a crisp circuit configured to remove a noise component from the contour component signal using a crisp signal for removing a noise component in the contour component signal transmitted from the second delay circuit and output a contour signal; a crisp gain control circuit configured to obtain a gain for controlling amplification of a signal becoming the basis of the crisp signal according to the video level and output the gain as a crisp gain; a multiplier configured to multiply the crisp gain and the signal becoming the basis of the crisp signal and output a crisp signal to the crisp circuit; a gain circuit configured to amplify the contour signal from which a noise component is removed in the crisp circuit; and an adder configured to add the video signal transmitted from the first delay circuit and the amplified contour signal transmitted from the gain circuit and output a contour-enhanced video signal.

Further, the crisp gain control circuit may set a video level of 100% as a normalized reference level, set a gain at the normalized reference level as 1, and output a crisp gain according to the video level from the video level detection circuit with respect to the normalized reference level.

Further, the crisp gain control circuit may output a crisp gain according to a video level on a line connecting a first point where the video level is zero and the crisp gain is zero and a second point where the video level is 100% and the crisp gain is 1, when the video level is indicated on a horizontal axis and the crisp gain is indicated on a vertical axis.

Further, the crisp gain control circuit may shift the first point in a horizontal axis direction or a vertical axis direction according to a tilt signal from the outside.

In accordance with another aspect of the present invention, there is provided a contour enhancement processing method used in a video signal processing unit of a television camera, including: a first delay means for delaying an inputted video signal; a contour extraction means for extracting a contour component signal from the video signal; a second delay means for delaying the contour component signal; a video level detection means for detecting a video level of the video signal and outputting the video level; a crisp means for removing a noise component from the contour component signal using a crisp signal for removing a noise component in the contour component signal transmitted from the second delay circuit and outputting a contour signal; a crisp gain control means for obtaining a gain for controlling amplification of a signal becoming the basis of the crisp signal according to the video level and outputting the gain as a crisp gain; a multiplication means for multiplying the crisp gain and the signal becoming the basis of the crisp signal and outputting a crisp signal to the crisp means; a gain means for amplifying the contour signal from which a noise component is removed in the crisp means; and an addition means for adding the video signal transmitted from the first delay means and the amplified contour signal transmitted from the gain means and outputting a contour-enhanced video signal.

Further, the crisp gain control means may set a video level of 100% as a normalized reference level, set a gain at the normalized reference level as 1, and output a crisp gain according to the video level from the video level detection means with respect to the normalized reference level.

Further, the crisp gain control means may output a crisp gain according to a video level on a line connecting a first point where the video level is zero and the crisp gain is zero and a second point where the video level is 100% and the crisp gain is 1, when the video level is indicated on a horizontal axis and the crisp gain is indicated on a vertical axis.

Further, the crisp gain control means may shift the first point in a horizontal axis direction or a vertical axis direction according to a tilt signal from the outside.

In accordance with another aspect of the present invention, there is provided a television camera including a prism configured to take a video image inputted from a lens, an imaging element, a CDS (Correlated Double Sampling) circuit, a VGA (Variable Gain Amplification) circuit, an A/D converter, a video signal processing unit, a video signal output unit and a timing generation unit, wherein the video signal processing unit includes: a first delay means for delaying an inputted video signal; a contour extraction means for extracting a contour component signal from the video signal; a second delay means for delaying the contour component signal; a video level detection means for detecting a video level of the video signal and outputting the video level; a crisp means for removing a noise component from the contour component signal using a crisp signal for removing a noise component in the contour component signal transmitted from the second delay circuit and outputting a contour signal; a crisp gain control means for obtaining a gain for controlling amplification of a signal becoming the basis of the crisp signal according to the video level and outputting the gain as a crisp gain; a multiplication means for multiplying the crisp gain and the signal becoming the basis of the crisp signal and outputting a crisp signal to the crisp means; a gain means for amplifying the contour signal from which a noise component is removed in the crisp means; and an addition means for adding the video signal transmitted from the first delay means and the amplified contour signal transmitted from the gain means and outputting a contour-enhanced video signal.

Further, the crisp gain control means may set a video level of 100% as a normalized reference level, set a gain at the normalized reference level as 1, and output a crisp gain according to the video level from the video level detection means with respect to the normalized reference level.

Further, the crisp gain control means may output a crisp gain according to a video level on a line connecting a first point where the video level is zero and the crisp gain is zero and a second point where the video level is 100% and the crisp gain is 1, when the video level is indicated on a horizontal axis and the crisp gain is indicated on a vertical axis.

Further, the crisp gain control means may shift the first point in a horizontal axis direction or a vertical axis direction according to a tilt signal from the outside.

Effects of the Invention

The present invention provides a contour enhancement processing circuit in which a first delay circuit delays an inputted video signal, a contour extraction circuit extracts a contour component signal from the video signal, a second delay circuit delays the contour component signal, a video level detection circuit detects a video level of the video signal and outputs the video level, a crisp circuit removes a noise component from the contour component signal using a crisp signal for removing a noise component in the contour component signal transmitted from the second delay circuit and outputs a contour signal, a crisp gain control circuit obtains a gain for controlling amplification of a signal becoming the basis of the crisp signal according to the video level and outputs the gain as a crisp gain, a multiplier multiplies the crisp gain and the signal becoming the basis of the crisp signal and outputs a crisp signal to the crisp circuit, a gain circuit amplifies the contour signal from which a noise component is removed in the crisp circuit, and an adder adds the video signal transmitted from the first delay circuit and the amplified contour signal transmitted from the gain circuit and outputs a contour-enhanced video signal. Therefore, the noise can be removed by performing an appropriate crisp process according to the video level, and a clear contour-enhanced video signal with little noise from the dark portion to the bright portion can be obtained.

DETAILED DESCRIPTION OF THE EMBODIMENTS

Embodiments of the present invention will be described with reference to the drawings.

Outline of Embodiment

In a contour enhancement processing circuit according to an embodiment of the present invention, a contour enhancement processing circuit in which a first delay circuit delays an inputted video signal, a contour extraction circuit extracts a contour component signal from the video signal, a second delay circuit delays the contour component signal, a video level detection circuit detects a video level of the video signal and outputs the video level, a crisp circuit removes a noise component from the contour component signal using a crisp signal for removing a noise component in the contour component signal transmitted from the second delay circuit and outputs a contour signal, a crisp gain control circuit controls a gain of the crisp signal according to the video level and outputs the gain of the crisp signal, a multiplier multiplies the gain the crisp signal and the signal becoming the basis of the crisp signal and outputs a crisp signal to the crisp circuit, a gain circuit amplifies the contour signal from which a noise component is removed in the crisp circuit, and an adder adds the video signal transmitted from the first delay circuit and the amplified contour signal transmitted from the gain circuit and outputs a contour-enhanced video signal. Therefore, the noise can be removed by performing an appropriate crisp process according to the video level, and a clear contour-enhanced video signal with little noise from the dark portion to the bright portion can be obtained.

Figure 1:
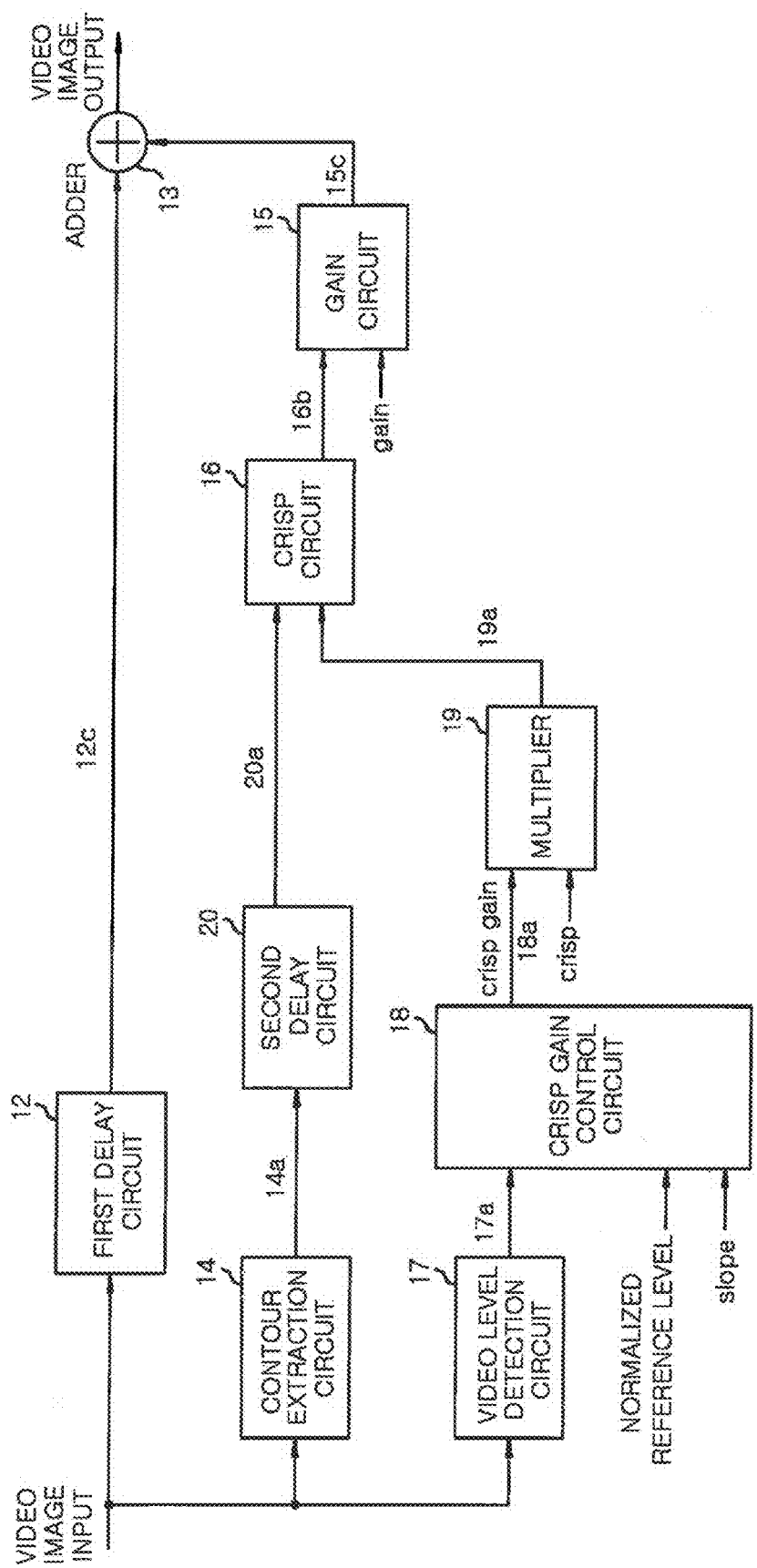
FIG. 1 is a configuration block diagram of a contour enhancement processing circuit according to an embodiment of the present invention.

(The Present Contour Enhancement Processing Circuit: FIG. 1)

A contour enhancement processing circuit according to an embodiment of the present invention (the present contour enhancement processing circuit) will be described with reference to FIG. 1. FIG. 1 is a configuration block diagram of the contour enhancement processing circuit according to an embodiment of the present invention.

As shown in FIG. 1, the present contour enhancement processing circuit includes a first delay circuit 12, an adder 13, a contour extraction circuit 14, a gain circuit 15, a crisp circuit 16, a video level detection circuit 17, a crisp gain control circuit 18, a multiplier 19, and a second delay circuit 20.

In a video signal processing unit of a television camera, the respective circuits mentioned above are sometimes referred to as a first delay means, an addition means, a contour extraction means, a gain means, a crisp means, a video level detection means, a crisp gain control means, a multiplication means, and a second delay means.

A video signal is inputted to the first delay circuit 12, the contour extraction circuit 14 and the video level detection circuit 17.

An output signal 12c from the first delay circuit 12 is inputted to the adder 13.

An output signal 14a from the contour extraction circuit 14 is inputted to the second delay circuit 20, an output signal 20a from the second delay circuit 20 is inputted to the crisp circuit 16, an output signal 16b from the crisp circuit 16 is inputted to the gain circuit 15, and an output signal 15c from the gain circuit 15 is inputted to the adder 13.

Furthermore, an output signal 17a from the video level detection circuit 17 is inputted to the crisp gain control circuit 18, an output signal 18a from the crisp gain control circuit 18 is inputted to the multiplier 19, and an output signal 19a from the multiplier 19 is inputted to the crisp circuit 16.

(Respective Parts of the Present Contour Enhancement Processing Circuit)

Next, the respective parts of the present contour enhancement processing circuit will be specifically described.

The first delay circuit 12 delays the inputted video signal by the processing time in the contour extraction circuit 14, the second delay circuit 20, the crisp circuit 16 and the gain circuit 15, and outputs a delayed video signal 12c to the adder 13.

The contour extraction circuit 14 extracts a signal of a contour component of the inputted video signal and outputs a contour signal 14a to the second delay circuit 20. Various methods for extracting a contour are known and any contour extraction method may be used.

A specific configuration of the contour extraction circuit 14 and a method of extracting a contour will be described later.

The video level detection circuit 17 detects a video level of the inputted video signal and outputs a video level signal (video level) 17a to the crisp gain control circuit 18.

The crisp gain control circuit 18 outputs, to the multiplier 19, a crisp gain signal (crisp gain) 18a for controlling the amplification of a signal (crisp original signal: crisp) becoming the basis of the crisp signal according to the video level 17a transmitted from the video level detection circuit 17.

Specifically, the crisp gain control circuit 18 receives a normalized reference level from the CPU 11 of the television camera. The normalized reference level is a signal when the video level is 100%. The normalized reference level is set so that the crisp gain is 1.0 at the normalized reference level.

Accordingly, the crisp gain control circuit 18 obtains a ratio of the video level 17a inputted from the video level detection circuit 17 to the video level of 100%, obtains a crisp gain according to the ratio, and outputs the crisp gain to the multiplier 19. Since the crisp gain is 1.0 at the video level of 100%, the crisp gain for the video level 17a inputted from the video level detection circuit 17 is in the range of 0 to 1.0.

The control of the crisp gain in the crisp gain control circuit 18 will be described later.

The multiplier 19 multiplies the crisp gain signal 18a and the signal (crisp original signal) becoming the basis of the crisp signal indicating a noise removal amount inputted from the CPU 11, and outputs a crisp signal (noise reduction amount) 19a to the crisp circuit 16.

That is, the crisp signal 19a is controlled to be variable according to the detected video level.

The second delay circuit 20 delays the inputted contour signal 14a such that the phase of the noise reduction amount 19a calculated by the video level detection circuit 17, the crisp gain control circuit 18 and the multiplier 19 matches the phase of the contour signal 14a.

The crisp circuit 16 removes a noise component from the contour signal 14a using the crisp signal 19a for removing a noise component in the contour signal 14a transmitted from the second delay circuit 20, and outputs a contour signal 16b.

The gain circuit 15 amplifies the contour signal 16b, from which the noise component is removed by the crisp circuit 16, by the amplification amount (gain) inputted from the CPU 11, and outputs an amplified contour signal 15c to the adder 13.

The adder 13 adds the video signal 12c transmitted from the first delay circuit 12 and the amplified contour signal 15c transmitted from the gain circuit 15, and outputs a contour-enhanced video signal in which the contour is enhanced.

Figure 2:
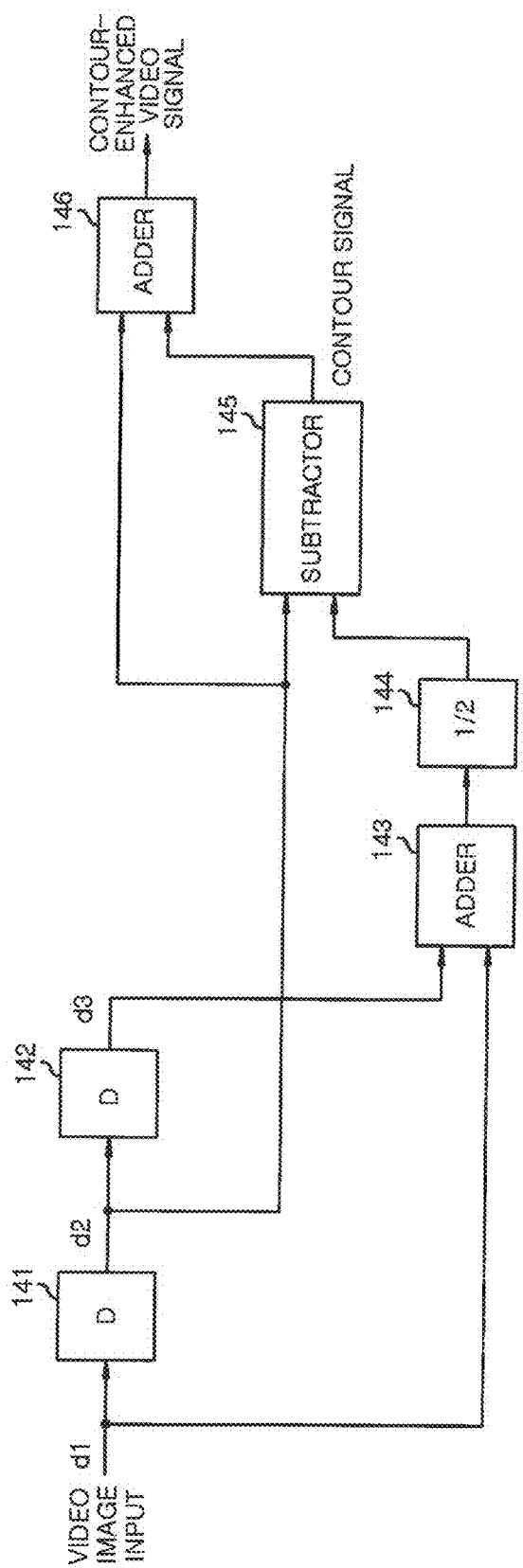
FIG. 2 is a configuration block diagram of a contour extraction circuit.

(Contour Extraction Circuit: FIG. 2)

Next, the contour extraction circuit in the present contour enhancement processing circuit will be described with reference to FIG. 2. FIG. 2 is a configuration block diagram of the contour extraction circuit.

As shown in FIG. 2, the contour extraction circuit 14 includes delay circuits (D) 141 and 142, an adder 143, a divider (½) 144, a subtractor 145, and an adder 146.

A video signal d1 is inputted to the delay circuit 141 and the adder 143, a video signal d2 delayed by the delay circuit 141 is inputted to the delay circuit 142, the subtractor 145 and the adder 146, and a video signal d3 delayed by the delay circuit 142 is inputted to the adder 143.

The video signal d1 and the video signal d3 transmitted from the delay circuit are added in the adder 143. The added video signal becomes a half (½) signal level by the divider 144 and is then outputted to the subtractor 145.

The subtractor 145 subtracts the signal of the divider 144 from the video signal d2 and outputs the subtracted signal to the adder 146 as a contour signal. Then, in the adder 146, the contour signal is added to the video signal d2, and a contour-enhanced video signal is outputted.

Figure 3:
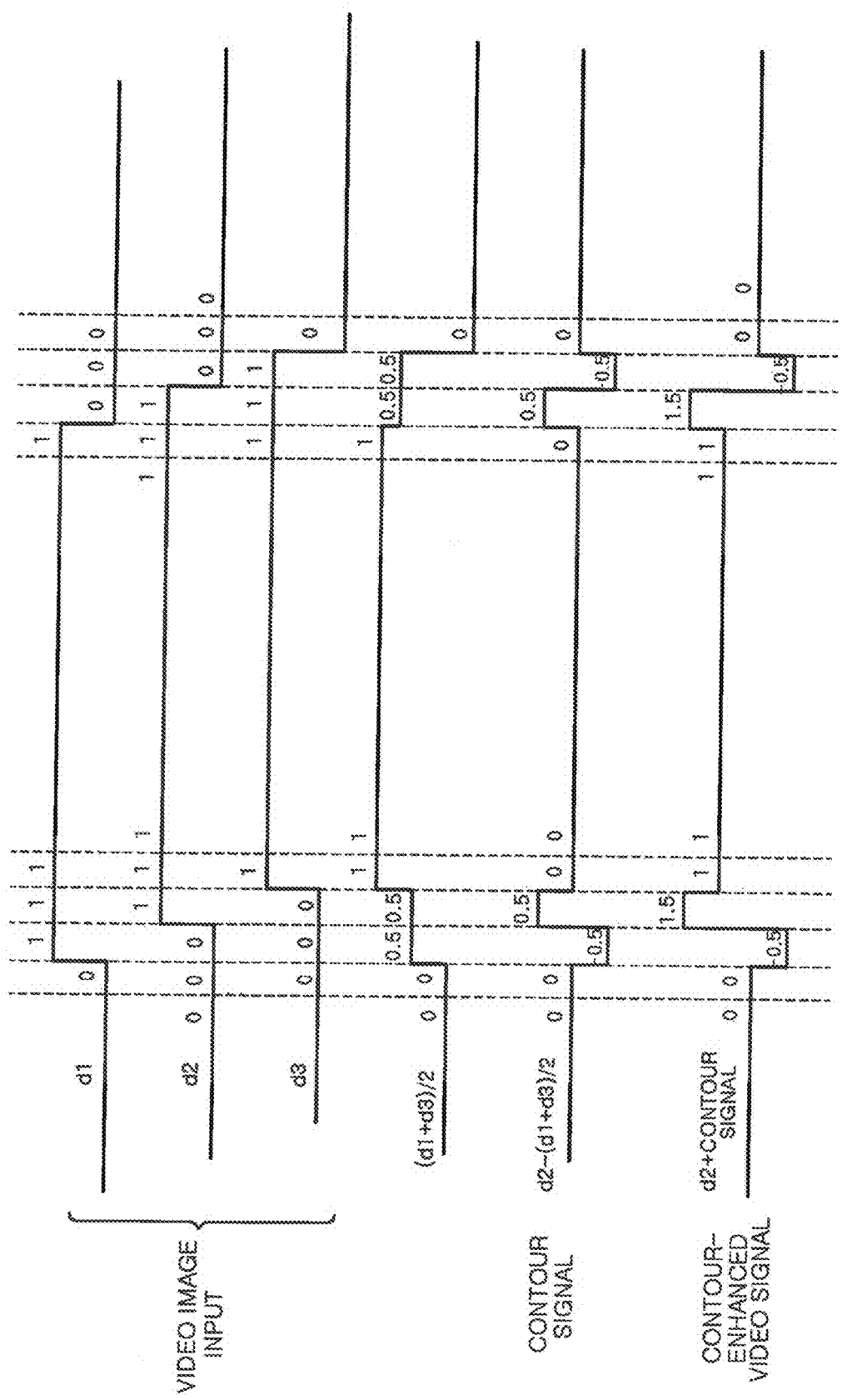
FIG. 3 is a diagram showing a time chart for the generation of a contour-enhanced video signal.

(Generation of Contour-Enhanced Video Signal: FIG. 3)

Next, the generation of a contour-enhanced video signal will be described with reference to FIG. 3. FIG. 3 is a diagram showing a time chart for the generation of a contour-enhanced video signal.

As shown in FIG. 3, in order to generate a contour-enhanced video signal, the video signals d2 and d3 are delayed with respect to the video signal d1, a video signal of d1+d3 is generated by the adder 143, and a video signal of (d1+d3)/2 is generated by the divider 144.

Then, the subtractor 145 performs a subtraction process to generate a video signal of d2−(d1+d3)/2 and to outputs the video signal of d2−(d1+d3)/2 as a contour signal.

Further, the adder 146 performs an addition process to generate a video signal of d2+contour signal and to output a contour-enhanced video signal.

Figure 4:
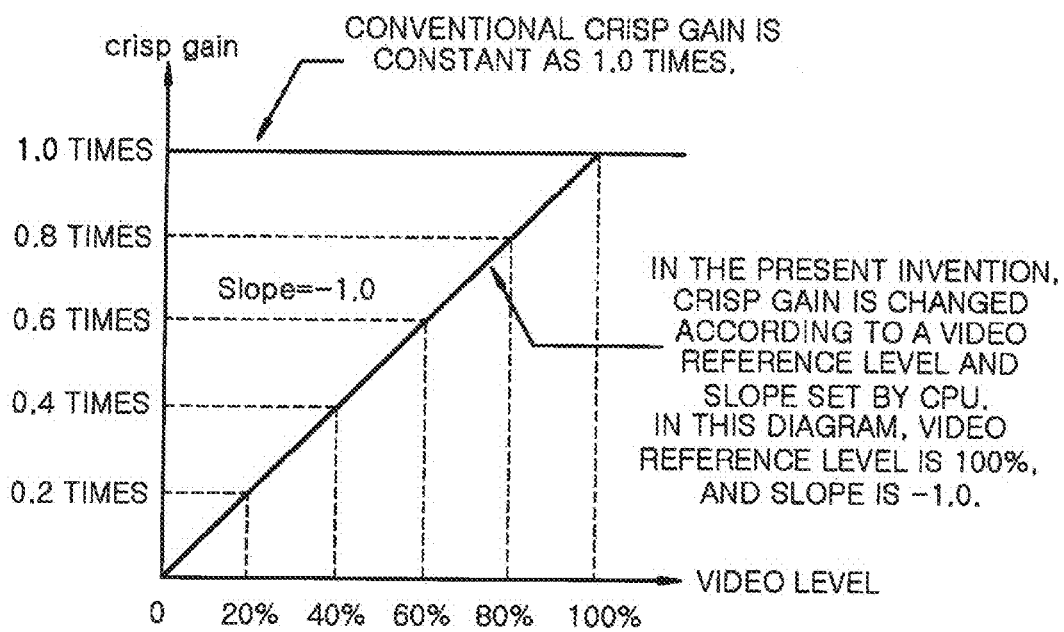
FIG. 4 is a diagram showing the relationship between a video level and a crisp gain.

(Relationship Between Video Level and Crisp Gain: FIG. 4)

Next, the relationship between a video level and a crisp gain will be described with reference to FIG. 4. FIG. 4 is a diagram showing the relationship between a video level and a crisp gain.

As shown in FIG. 4, the crisp gain of the inputted video level 17a is specified by using a straight line connecting a point (a second point in the claims) where the crisp gain is 1.0 times with respect to the video level of 100% and a zero point (a first point in the claims) where the crisp gain is 0 times with respect to the video level of 0%.

In this regard, the normalized reference level inputted to the crisp gain control circuit 18 is a reference level at which the video level in FIG. 4 is 100%. In other words, the crisp gain control circuit 18 determines what percentage of the reference level the video level 17a inputted from the video level detection circuit 17 is with the normalized reference level as the reference level of the video level 100%. The crisp gain is obtained by using a slope line of FIG. 4.

Incidentally, the conventional crisp gain is constant as 1.0 times.

(Signal Waveform Showing the Present Contour Enhancement Process: FIGS. 5A to 5E)

Next, a signal waveform showing the present contour enhancement process will be described with reference to FIGS. 5A to 5E. FIGS. 5A to 5E are signal waveform diagrams showing the present contour enhancement process.

Figure 5A:
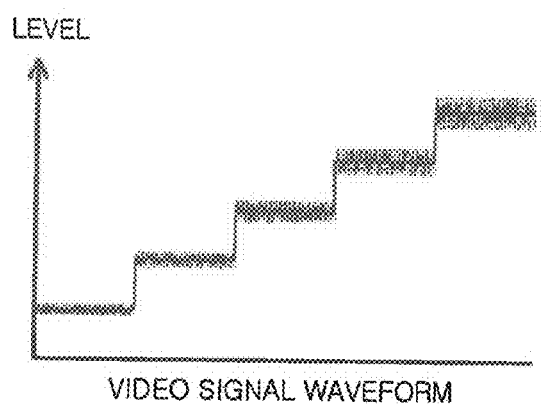
FIGS. 5A to 5E are signal waveform diagrams showing a contour enhancement process.

In FIG. 5A, there is shown a video signal waveform containing a noise. The noise has a characteristic that the noise increases in proportion to the video level.

Figure 5B:
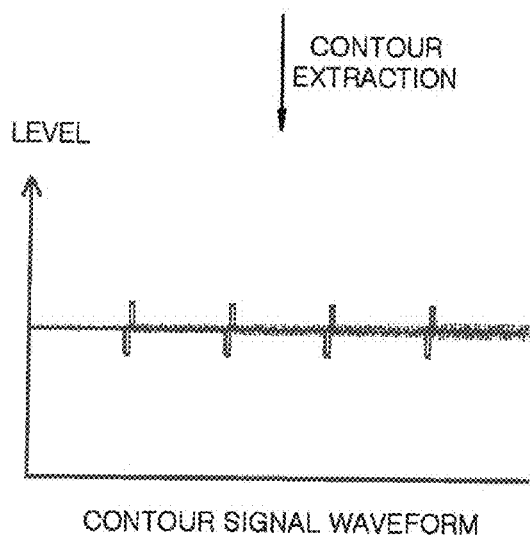

In FIG. 5B, there is shown a contour signal waveform in which a contour component is extracted from the video signal by the contour extraction circuit 14. Since a noise component is also extracted, the noise is also contained in the contour signal waveform.

Figure 5C:
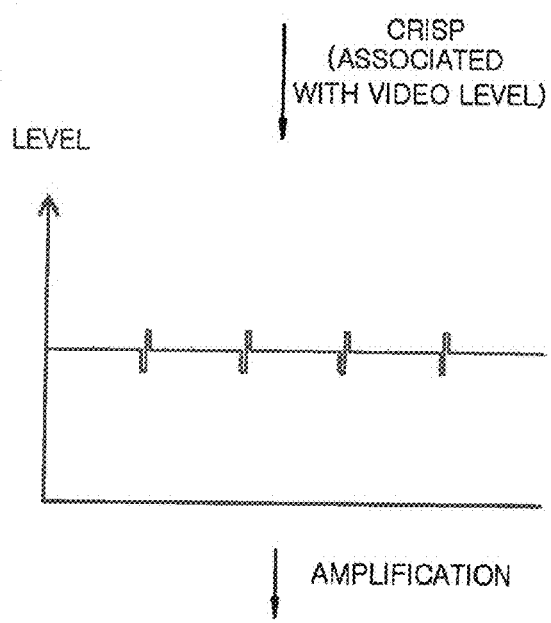

In FIG. 5C, there is shown a contour signal waveform in which a noise is removed from the video signal by the crisp circuit 16 using the crisp signal adjusted by the video level detection circuit 17, the crisp gain control circuit 18 and the multiplier 19. Unlike the conventional crisp process, noise removal is performed according to the noise amount over the entire portion from a low video level portion to a high video level portion. Thus, there is no possibility that the contour signal becomes unnecessarily small or the contour signal disappears.

Figure 5D:
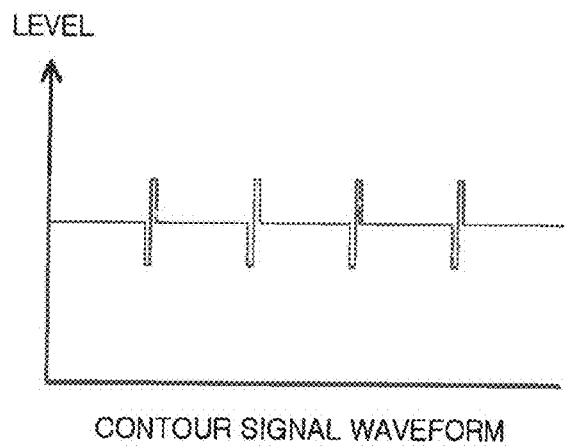

In FIG. 5D, there is shown a contour signal waveform obtained by amplifying the contour signal from the crisp circuit 16 using the gain circuit 15. Since the noise is removed in the crisp process, only the contour is amplified.

Figure 5E:
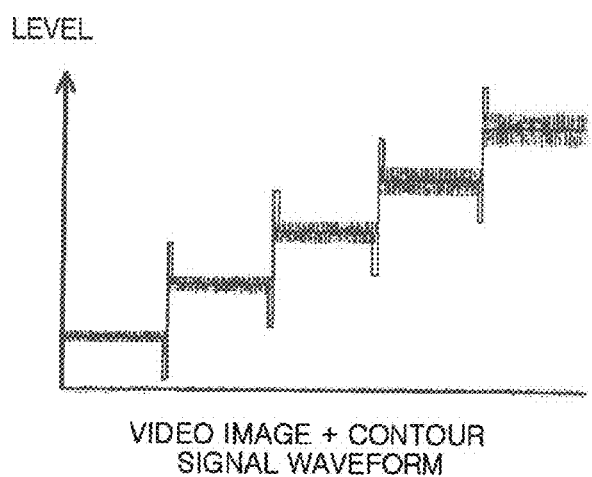

In FIG. 5E, the adder 13 obtains a contour-enhanced video signal by adding (synthesizing) the contour signal transmitted from the gain circuit 15 to the video signal transmitted from the first delay circuit 12. The contour-enhanced video signal is a video image in which the sharpness of the contour is increased and only the noise of the video signal is contained without the noise of the contour signal.

In this manner, it is possible to generate a contour signal capable of completely eliminating the noise component in the contour signal extracted from the video signal and sufficiently enhancing the contour portion.

Figure 6:
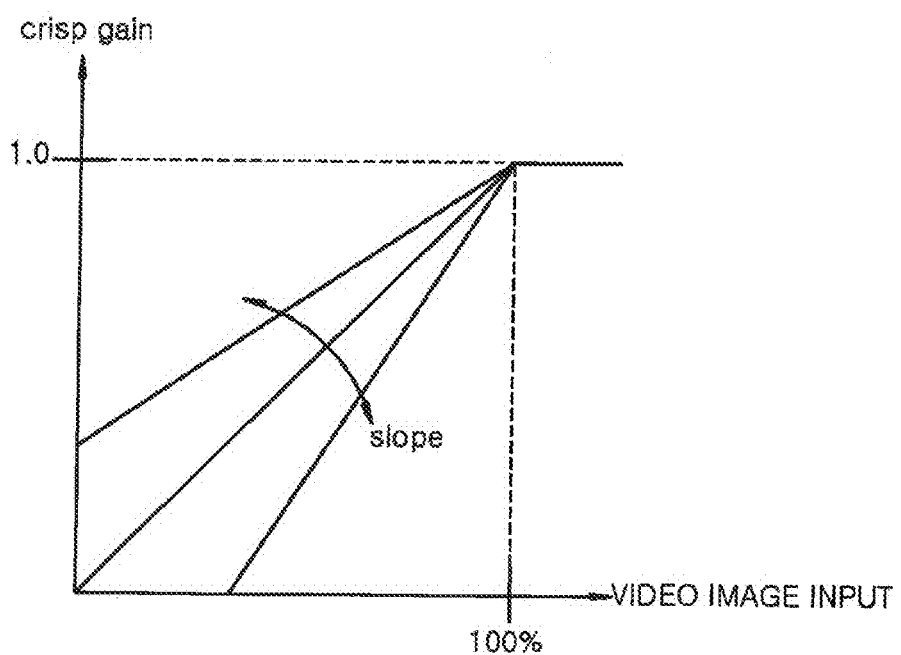
FIG. 6 is a diagram showing the control of a slope of a crisp gain with respect to a video level.
Figure 7:
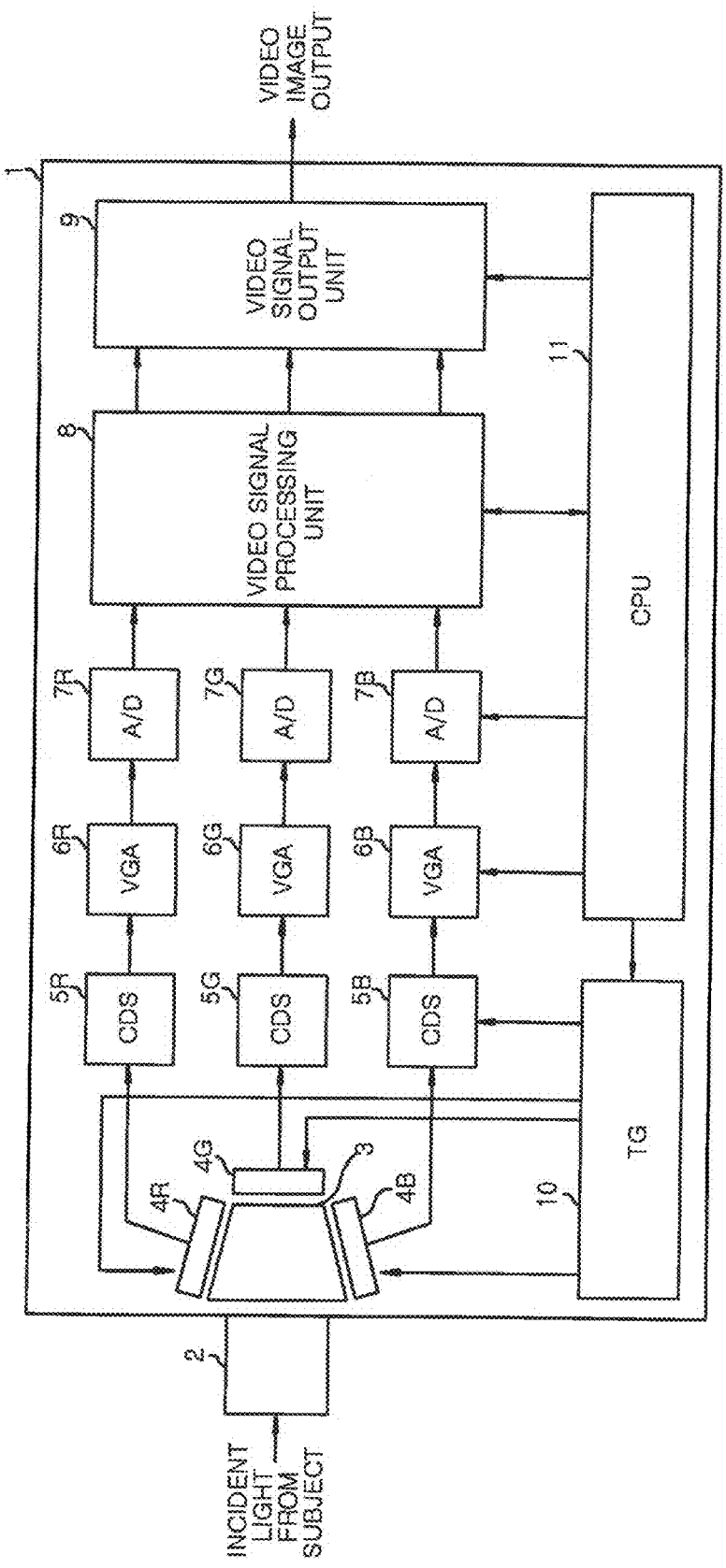
FIG. 7 is a configuration block diagram of a television camera.
Figure 8:
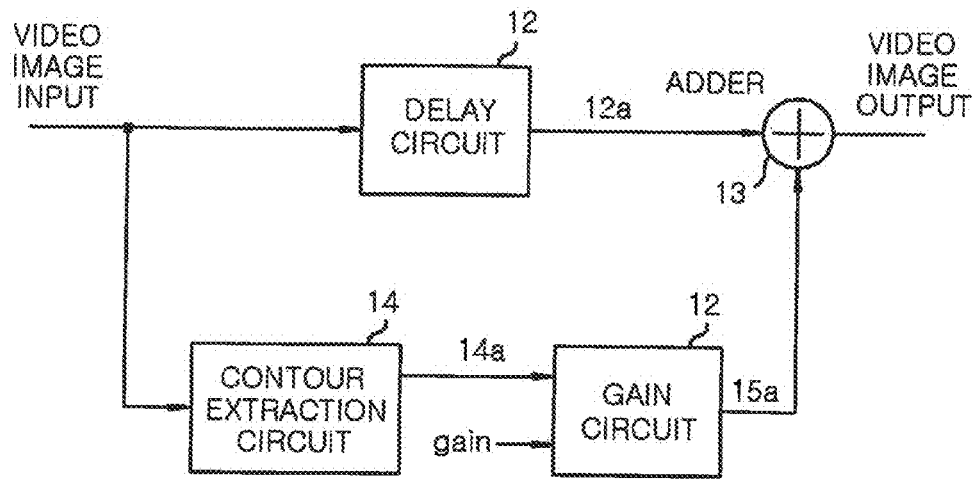
FIG. 8 is a configuration block diagram of a conventional first contour enhancement processing circuit.
Figure 9A:
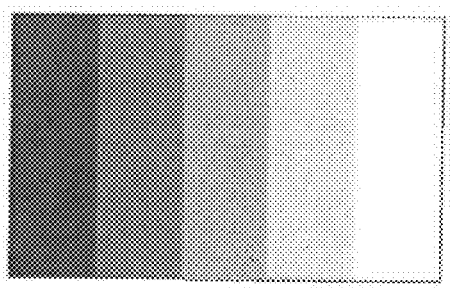
FIG. 9A is a diagram showing an original video example (a video example before contour enhancement)
Figure 9B:
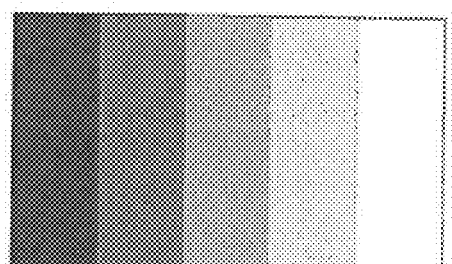
FIG. 9B is a diagram showing a video example after contour enhancement.
Figure 10A:
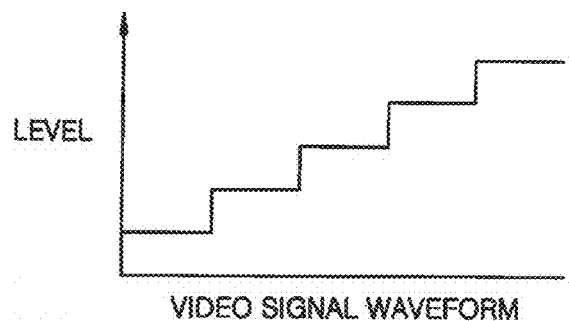
FIGS. 10A to 10D are signal waveform diagrams showing an ideal contour enhancement process.
Figure 10B:
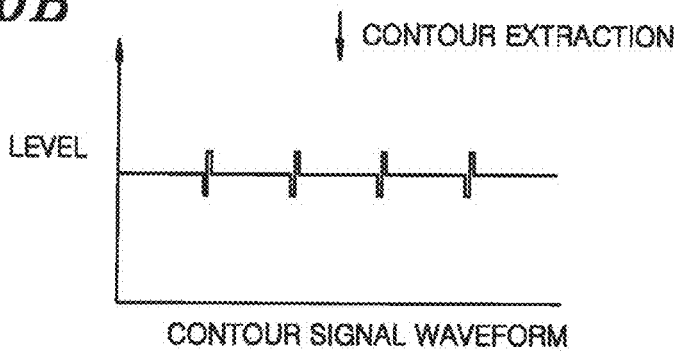
Figure 10C:
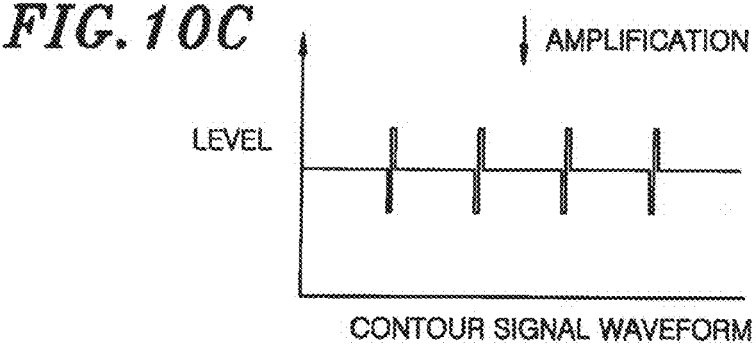
Figure 10D:
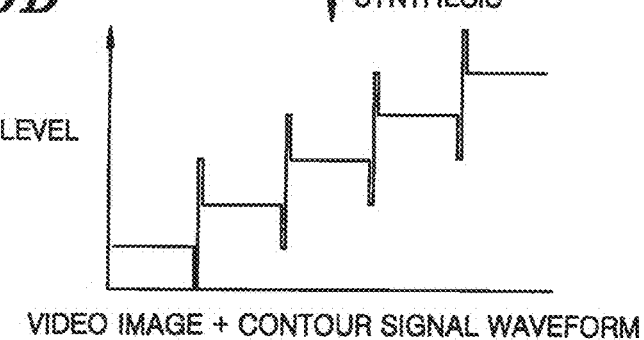
Figure 11A:
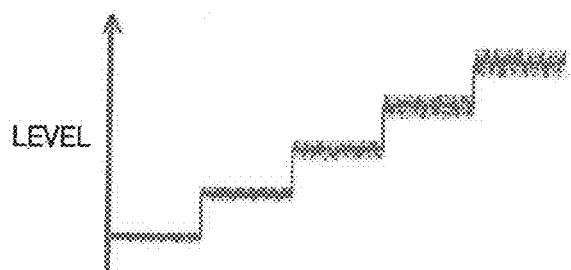
FIGS. 11A to 11D are signal waveform diagrams in a case where a noise is contained in a video signal.
Figure 11B:
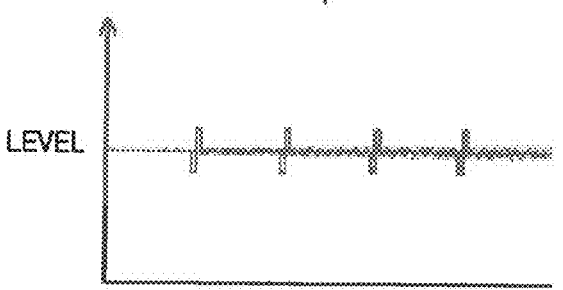
Figure 11C:
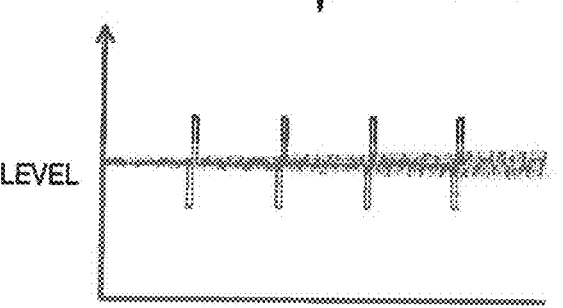
Figure 11D:
Figure 12:
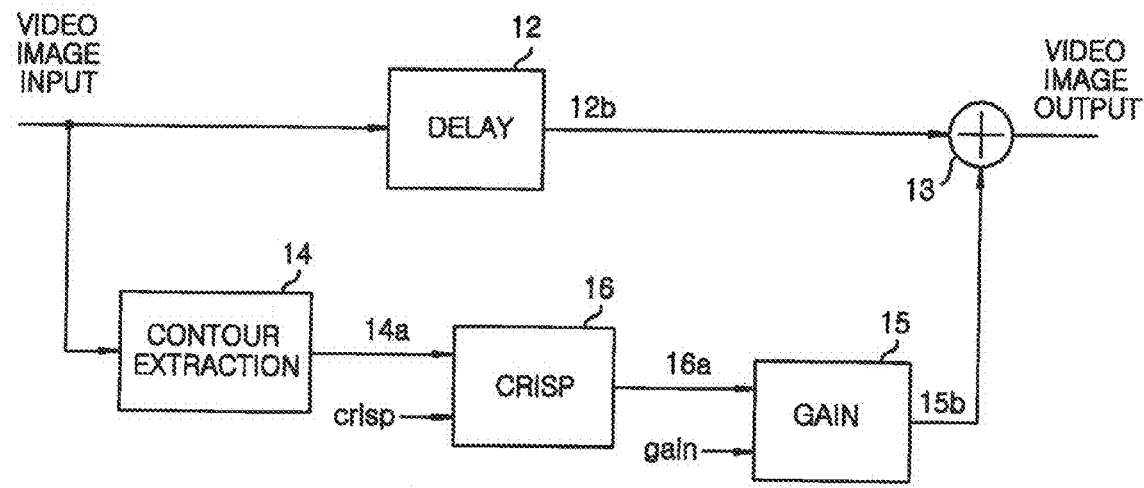
FIG. 12 is a configuration block diagram of a second conventional contour enhancement processing circuit.
Figure 13:
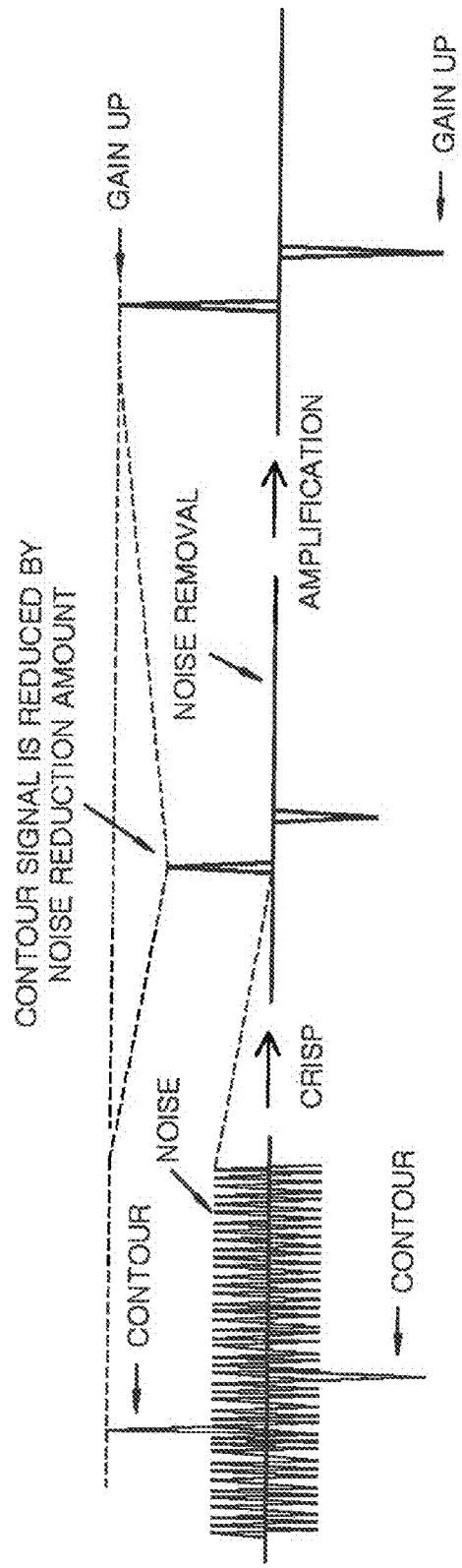
FIG. 13 is a signal waveform diagram showing a crisp function.
Figure 14A:
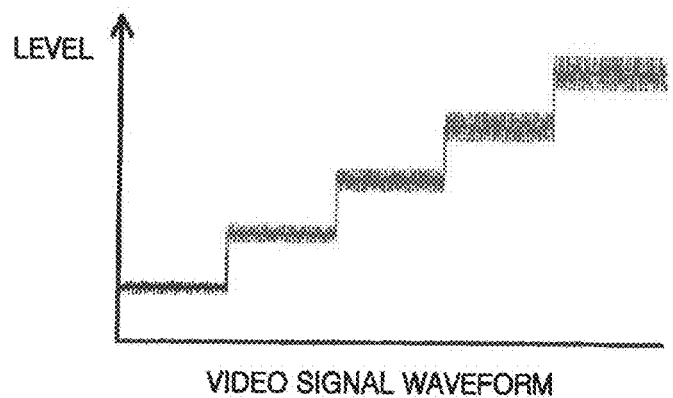
FIGS. 14A to 14E are signal waveform diagrams showing a conventional second contour enhancement process.
Figure 14B:
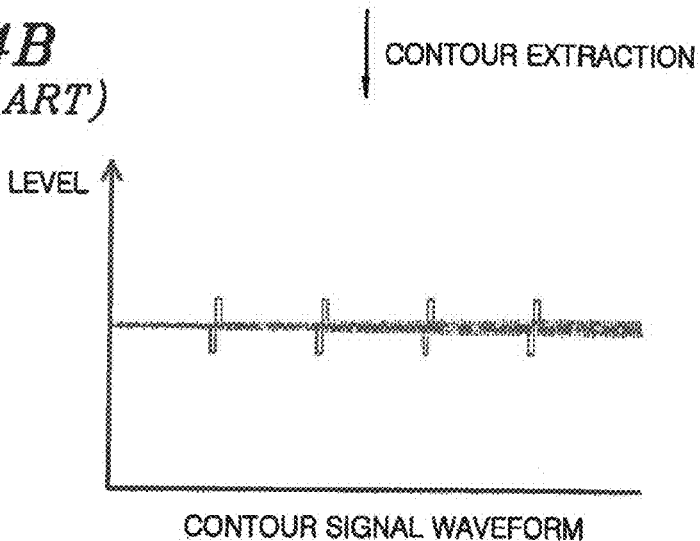
Figure 14C:
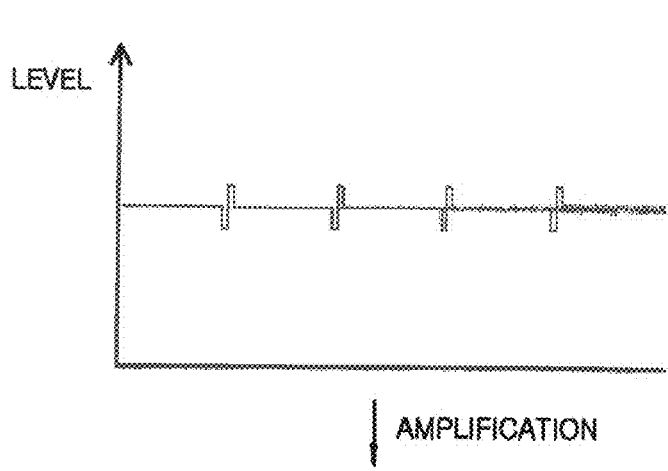
Figure 14D:
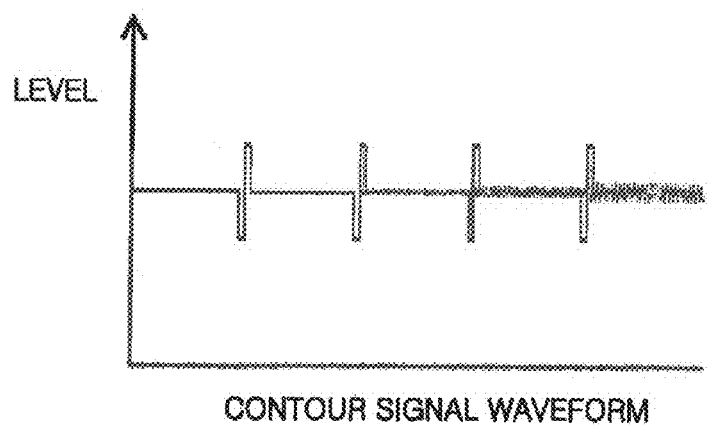
Figure 14E:
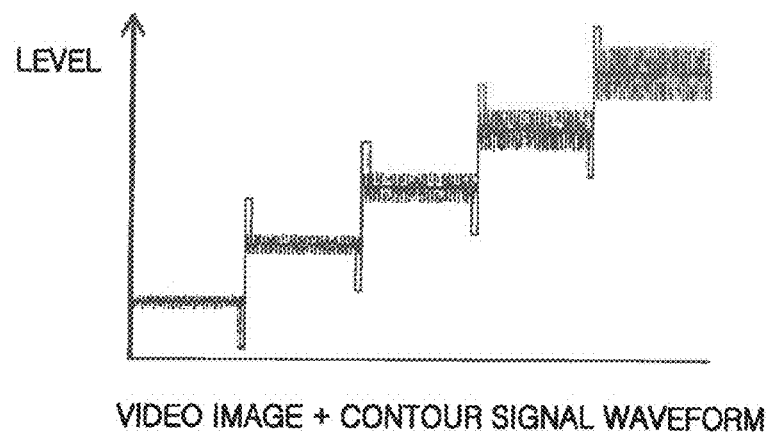
Figure 15:
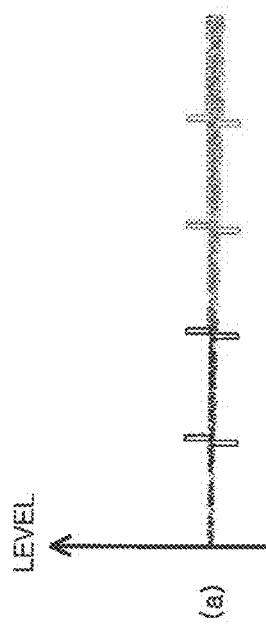
FIG. 15 is a contour signal waveform diagram for explaining a problem of prior art.

(Slope Control of Crisp Gain with Respect to Video Level: FIG. 6)

Next, the slope control of the crisp gain with respect to the video level will be described with reference to FIG. 6. FIG. 6 is a diagram showing the slope control of the crisp gain with respect to the video level.

As shown in FIG. 6, the slope of an oblique line can be arbitrarily changed about a point where the crisp gain is 1.0 times at the video level of 100%. The slope of the crisp gain with respect to the video level can be controlled by the slope signal (slope) inputted to the crisp gain control circuit 18.

In FIG. 6, when the oblique line is changed to the lower side with respect to the central reference oblique line, the crisp gain is 0 times at the video level of about 20%. The crisp function does not work in the dark image with the video level of 20% or less. Thus, the noise removal cannot be performed.

Furthermore, if the oblique line is changed to the upper side with respect to the reference oblique line, the crisp gain is about 0.25 times even at the video level of 0%. Even in the dark image with the video level of 0%, the crisp function works a little bit to eliminate a noise.

That is, the degree of effectiveness of the crisp function is adjusted by the slope signal according to the situation of the video signal.

Effect of Embodiment

According to the present contour enhancement processing circuit, the degree of operation of the crisp function in the crisp circuit 16 is controlled according to the video level of the video signal. Therefore, it is possible to completely eliminate the noise generated in the contour signal and to obtain a contour-enhanced video signal with less noise without reducing the contour portion of the contour signal.

Further, according to the present contour enhancement processing circuit, it is possible to control the slope of the reference oblique line indicating the relationship between the video level and the crisp gain. Therefore, the slope of the oblique line can be controlled according to the situation of the video image, and the noise removal can be realized by performing an appropriate crisp process according to the video image.

INDUSTRIAL APPLICABILITY

The present invention is suitable for a contour enhancement processing circuit, a contour enhancement processing method and a television camera, which are capable of making sure that the amount of noise to be removed in a crisp circuit can be made variable according to a video signal level and capable of realizing a clear contour enhancement process with little noise from a dark portion to a bright portion. This application claims the benefit of priority based on Japanese Patent Application No. 2015-222457 filed on Nov. 12, 2015, the disclosure of which is incorporated herein by reference in its entirety.

Description of Reference Numerals

1: television camera
2: lens
3: prism
4: imaging element
5: CDS (Correlated Double Sampling) circuit
6: VGA (Variable Gain Amplification) circuit
7: A/D converter,
8: video signal processing unit
9: video signal output unit
10: TG (timing generation unit)
11: CPU (Control Unit)
12: first delay circuit (delay circuit)
13: adder
14: contour extraction circuit
15: gain circuit
16: crisp circuit
17: video level detection circuit
18: crisp gain control circuit
19: multiplier
20: second delay circuit
141, 142: delay circuit (D)
143: adder
144: divider (1/2)
145: subtractor
146: adder

What is claimed is:

1. A contour enhancement processing circuit used in a video signal processing unit of a television camera, comprising:
a first delay circuit configured to delay an inputted video signal;
a contour extraction circuit configured to extract a contour component signal from the video signal;
a second delay circuit configured to delay the contour component signal;
a video level detection circuit configured to detect a video level of the video signal and output the video level;
a crisp circuit configured to remove a noise component from the contour component signal transmitted from the second delay circuit using a crisp signal for removing the noise component in the contour component signal and output a contour signal;
a crisp gain control circuit configured to obtain a gain for controlling amplification of a crisp original signal for generating the crisp signal according to the video level and output the gain as a crisp gain;
a multiplier configured to multiply the crisp gain and the crisp original signal to generate the crisp signal and output the crisp signal to the crisp circuit;
a gain circuit configured to amplify the contour signal from which the noise component is removed in the crisp circuit; and
an adder configured to add the video signal transmitted from the first delay circuit and the amplified contour signal transmitted from the gain circuit and output a contour-enhanced video signal.

2. The contour enhancement processing circuit of claim 1, wherein the crisp gain control circuit sets a video level of 100% as a normalized reference level, sets a gain at the normalized reference level as 1, and outputs a crisp gain according to the video level from the video level detection circuit with respect to the normalized reference level.

3. The contour enhancement processing circuit of claim 2, wherein the crisp gain control circuit outputs a crisp gain according to a video level on a line connecting a first point where the video level is zero and the crisp gain is zero and a second point where the video level is 100% and the crisp gain is 1, when the video level is indicated on a horizontal axis and the crisp gain is indicated on a vertical axis.

4. The contour enhancement processing circuit of claim 3, wherein the crisp gain control circuit shifts the first point in a horizontal axis direction or a vertical axis direction according to a tilt signal from the outside for changing a slope of the line connecting the first point and the second point.

5. A contour enhancement processing method used in a video signal processing unit of a television camera, comprising:
a first delay means for delaying an inputted video signal;
a contour extraction means for extracting a contour component signal from the video signal;
a second delay means for delaying the contour component signal;
a video level detection means for detecting a video level of the video signal and outputting the video level;
a crisp means for removing a noise component from the contour component signal transmitted from the second delay circuit using a crisp means for removing a noise component from the contour component signal transmitted from the second delay means and outputting a contour signal;
a crisp gain control means for obtaining a gain for controlling amplification of a crisp original signal for generating the crisp signal according to the video level and outputting the gain as a crisp gain;
a multiplication means for multiplying the crisp gain and the crisp original signal to generate the crisp signal and outputting the crisp signal to the crisp means;
a gain means for amplifying the contour signal from which the noise component is removed in the crisp means; and
an addition means for adding the video signal transmitted from the first delay means and the amplified contour signal transmitted from the gain means and outputting a contour-enhanced video signal,
wherein the crisp gain control means sets a video level of 100% as a normalized reference level, sets a gain at the normalized reference level as 1, and outputs a crisp gain according to the video level from the video level detection means with respect to the normalized reference level,
the crisp gain control means outputs a crisp gain according to a video level on a line connecting a first point where the video level is zero and the crisp gain is zero and a second point where the video level is 100% and the crisp gain is 1, when the video level is indicated on a horizontal axis and the crisp gain is indicated on a vertical axis, and
the crisp gain control means shifts the first point in a horizontal axis direction or a vertical axis direction according to a tilt signal from the outside for changing a slope of the line connecting the first point and the second point.

6. A television camera including a prism configured to take a video image inputted from a lens, an imaging element, a CDS (Correlated Double Sampling) circuit, a VGA (Variable Gain Amplification) circuit, an A/D converter, a video signal processing unit, a video signal output unit and a timing generation unit, wherein:
the video signal processing unit comprises:
a first delay means for delaying an inputted video signal;
a contour extraction means for extracting a contour component signal from the video signal;
a second delay means for delaying the contour component signal;

a video level detection means for detecting a video level of the video signal and outputting the video level;

a crisp means for removing a noise component from the contour component signal transmitted from the second delay circuit using a crisp means for removing a noise component from the contour component signal transmitted from the second delay means and outputting a contour signal;

a crisp gain control means for obtaining a gain for controlling amplification of a crisp original signal for generating the crisp signal according to the video level and outputting the gain as a crisp gain;

a multiplication means for multiplying the crisp gain and the crisp original signal to generate the crisp signal and outputting the crisp signal to the crisp means;

a gain means for amplifying the contour signal from which the noise component is removed in the crisp means; and an addition means for adding the video signal transmitted from the first delay means and the amplified contour signal transmitted from the gain means and outputting a contour-enhanced video signal, wherein the crisp gain control means sets a video level of 100% as a normalized reference level, sets a gain at the normalized reference level as 1, and outputs a crisp gain according to the video level from the video level detection means with respect to the normalized reference level, the crisp gain control means outputs a crisp gain according to a video level on a line connecting a first point where the video level is zero and the crisp gain is zero and a second point where the video level is 100% and the crisp gain is 1, when the video level is indicated on a horizontal axis and the crisp gain is indicated on a vertical axis, and the crisp gain control means shifts the first point in a horizontal axis direction or a vertical axis direction according to a tilt signal from the outside for changing a slope of the line connecting the first point and the second point.

* * * * *